United States Patent
Ozaki et al.

[11] Patent Number: 5,910,860
[45] Date of Patent: Jun. 8, 1999

[54] ZOOM LENS

[75] Inventors: Hiroyasu Ozaki, Tokyo; Takayuki Ito, Saitama-ken, both of Japan

[73] Assignee: Asahi Kogaku Kogyo Kabushiki Kaisha, Tokyo, Japan

[21] Appl. No.: 09/006,896

[22] Filed: Jan. 14, 1998

[30] Foreign Application Priority Data

Jan. 17, 1997 [JP] Japan .................................. 9-006587

[51] Int. Cl.⁶ .................................................. G02B 13/18
[52] U.S. Cl. .......................................... 359/691; 351/676
[58] Field of Search ................................ 359/691, 676, 359/683, 684

[56] References Cited

U.S. PATENT DOCUMENTS

| | | |
|---|---|---|
| 4,406,523 | 9/1983 | Sato . |
| 4,474,436 | 10/1984 | Itoh . |
| 4,730,906 | 3/1988 | Okudaira . |
| 4,973,143 | 11/1990 | Ishii et al. . |
| 5,331,464 | 7/1994 | Itoh . |

FOREIGN PATENT DOCUMENTS

| | | |
|---|---|---|
| 2120713 | 5/1990 | Japan . |
| 4-55810 | 2/1992 | Japan . |
| 7-35975 | 2/1995 | Japan . |

*Primary Examiner*—Hung Xuan Dang
*Attorney, Agent, or Firm*—Greenblum & Bernstein, P.L.C.

[57] ABSTRACT

A zoom lens includes a first movable lens group having negative power and a second movable lens group having positive power, and an immovable diaphragm provided between the first and second lens groups so as not to move during the zooming operation. The zoom lens satisfies (1) $0.45 < f_w/f_2 < 0.7$, (2) $0.5 < f_2/|f_1| < 1.0$, and (3) $0.8 < D_w/f_2 < 1.3$, whereby $f_w$ represents the focal length of the entire optical system at the wide-angle extremity, $f_1$ represents the focal length of the first lens group ($f_1 < 0$), $f_2$ represents the focal length of the second lens group ($f_2 > 0$), and $D_w$ represents the distance between the diaphragm and the first principal point of the second lens group at the wide-angle extremity.

5 Claims, 10 Drawing Sheets

SPHERICAL
ABERRATION

CHROMATIC
ABERRATION

TRANSVERSE
CHROMATIC
ABERRATION

ASTIGMATISM

DISTORTION

SPHERICAL
ABERRATION
CHROMATIC
ABERRATION

TRANSVERSE
CHROMATIC
ABERRATION

ASTIGMATISM

DISTORTION

FIG. 8

FIG. 9A 
1: 2.8
-0.05  0.05
SPHERICAL
ABERRATION
CHROMATIC
ABERRATION

FIG. 9B 
W= 27.3°
-0.01  0.01
TRANSVERSE
CHROMATIC
ABERRATION

FIG. 9C 
W= 27.3°
-0.05  0.05
ASTIGMATISM

FIG. 9D 
W= 27.3°
-5.0 (%) 5.0
DISTORTION

SPHERICAL
ABERRATION
CHROMATIC
ABERRATION

FIG. 11B
W= 19.7°

TRANSVERSE
CHROMATIC
ABERRATION

FIG. 11C
W= 19.7°

ASTIGMATISM

FIG. 11D
W= 19.7°

DISTORTION

SPHERICAL
ABERRATION

CHROMATIC
ABERRATION

TRANSVERSE
CHROMATIC
ABERRATION

ASTIGMATISM

DISTORTION

SPHERICAL
ABERRATION

CHROMATIC
ABERRATION

TRANSVERSE
CHROMATIC
ABERRATION

ASTIGMATISM

DISTORTION

SPHERICAL ABERRATION

CHROMATIC ABERRATION

TRANSVERSE CHROMATIC ABERRATION

ASTIGMATISM

DISTORTION

SPHERICAL
ABERRATION
CHROMATIC
ABERRATION

TRANSVERSE
CHROMATIC
ABERRATION

ASTIGMATISM

DISTORTION

ZOOM LENS

BACKGROUND OF THE INVENTION

1. Field of the Invention

The present invention relates to a quasi wide-angle zoom lens, having a zoom ratio of approximately 2, for a digital camera or video camera or other cameras, in which an image is formed on a solid state image pickup device (CCD).

2. Description of the Related Art

A zoom lens consisting of a first negative lens group and a second positive lens group is known in the art of quasi wide-angle zoom lenses (focal length being in the range of approximately 43 to 86 mm in terms of that of a lens for 35 mm format). In the known two (double)-lens-group zoom lens, since a diaphragm is provided in or near the second lens group and is moved together with the second lens group, it is impossible to increase the distance between an exit pupil of the entire zoom lens system and an image forming surface, particularly at the wide-angle extremity, and hence the known two-lens-group zoom lens is not useful for a CCD camera. This is because, in a CCD camera, telecentricity of the zoom lens in which light emitted from the lens is incident on the CCD at almost right angles is preferred to ensure a uniform or regular color.

Moreover, the movable diaphragm increases the manufacturing cost of the lens frame structure. Furthermore, a large negative distortion occurs particularly near the wide-angle extremity, due to the arrangement of the negative and positive lens groups on opposite sides of the diaphragm.

SUMMARY OF THE INVENTION

It is an object of the present invention to provide a zoom lens in which a sufficient exit pupil distance can be obtained over the entire zoom range from the wide-angle extremity to the telephoto extremity; the lens frame structure is simplified. In this specification, the distance between the exit pupil and the image forming surface is referred to as the exit pupil distance.

It is another object of the present invention to effectively correct the negative distortion of the zoom lens.

To achieve the object mentioned above, according to the present invention, there is provided: a zoom lens comprising a first movable lens group having negative refracting power and a second movable lens group having positive refracting power, in this order from the object side; an immovable diaphragm provided between the first and second lens groups as not to move during the zooming operation. The zoom lens satisfies the following conditions:

(1) $0.45 < f_w/f_2 < 0.7$ (2) $0.5 < f_2/|f_1| < 1.0$ (3) $0.8 < D_w/f_2 < 1.3$ wherein:
fw represents the focal length of the entire optical system at the wide-angle extremity,
$f_1$ represents the focal length of the first lens group ($f_1 < 0$),
$f_2$ represents the focal length of the second lens group ($f_2 > 0$)
$D_w$ represents the distance between the diaphragm and the first principal point of the second lens group at the wide-angle extremity.

Preferably, the first lens group includes a positive lens element which is located closest to the object which satisfies the following condition:

(4) $0.2 < |f_1|/f_{1-1} < 0.7$ wherein:
$f_{1-1}$ represents the focal length of the positive lens, element of the first lens group ($f_{1-1} > 0$).

In an embodiment, a surface of the positive lens element at the object side comprises a convex surface.

In an embodiment, the first and second lens groups are moved toward each other during the zooming operation from the short focal length extremity toward the long focal length extremity and are moved away from each other during the zooming operation from the long focal length extremity toward the short focal length extremity; the diaphragm being immovable. To this end, it is preferred that the following condition is satisfied:

$f_T < |f_1|$ wherein $f_T$ represents the focal length of the entire zoom lens at the telephoto extremity.

The present disclosure relates to subject matter contained in Japanese Patent Application No. 9-6587 (filed on Jan. 17, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
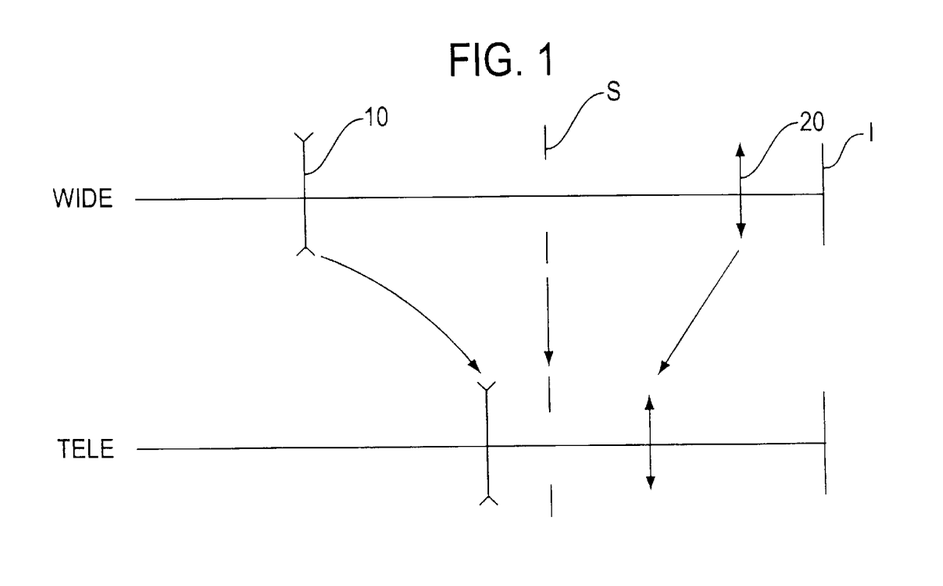
FIG. 1 is a schematic view of a lens arrangement and tracks of the movement of lenses of a zoom lens during the zooming operation according to the present invention.

In the illustrated embodiment, as can be seen in FIG. 1, a zoom lens is comprised of a first movable negative lens group 10, an immovable or fixed diaphragm S, and a second movable positive lens group 20, in this order from the object side. The first lens group 10 is moved from the object side toward the image forming surface side (i.e., toward the immovable diaphragm S) and the second lens group 20 is moved from the image forming surface side toward the object side (i.e., toward the fixed diaphragm S) along the tracks shown in FIG. 1 during the zooming operation from the short focal length extremity to the long focal length extremity. Namely, the first and second lens groups 10 and 20 are moved toward each other with respect to the fixed diaphragm during the zooming from the short focal length extremity to the long focal length extremity and are moved away from each other during the zooming from the long focal length extremity to the short focal length extremity. No focus shift occurs during the zooming operation. The focusing is carried out by moving the first lens group in optical axis directions.

The arrangement of the immovable diaphragm S between the first and second movable lens groups 10 and 20 in a fixed state simplifies the structure of the lens frames.

If the conditions (1) through (3) are satisfied, not only the power of the second lens group can be increased but also the moving amount of the second lens group can be restricted. Also, it can be prevented that the exit pupil moves to a position too close to the image surface particularly at the wide-angle extremity, and thus, the power of the second lens group and the position of the diaphragm can be appropriately set. Consequently, a good telecentricity can be realized.

Moreover, according to an aspect of the present invention, the frontmost lens element of the first lens group 10 closest to the object side is made of a positive lens element. This means that the lens element farthest from the diaphragm toward the object is a positive lens, and hence the negative distortion can be effectively corrected. Generally, the negative distortion can be effectively corrected by the positive lens element located as distant as possible from the diaphragm.

Condition (1) concerns the miniaturization of the lens system and the enhancement of the optical property thereof, and specifies the power of the second lens group. If the ratio defined in condition (1) is above the upper limit, neither coma nor astigmatism can be corrected nor can enough back focal distance be obtained. Conversely, if the ratio is below the lower limit in condition (1), the length of the entire lens system becomes long and the amount of movement of the second lens group is increased, and hence the exit pupil distance varies largely during the zooming operation.

Condition (2) specifies the ratio of the focal length between the first and second lens groups and indirectly specifies the amount of movement of the first and second lens groups.

If the ratio is above the upper limit in condition (2), the power of the second lens group becomes small, and the amount of movement of the second lens group is increased, so that the position of the exit pupil varies largely upon zooming. Since the exit pupil distance is smallest at the telephoto extremity in the two-lens-group zoom lens in which the diaphragm is immovable, according to the present invention, it is impossible to obtain a sufficient exit pupil distance at the telephoto extremity.

Conversely, if the ratio is smaller than the lower limit in condition (2), the power of the first lens group is small; the amount of movement of the first lens group is increased; and the diameter of the first lens group becomes too large.

Condition (3) specifies the position of the diaphragm relative to the second lens group and determines the conditions necessary to obtain a sufficient exit pupil distance (distance between the exit pupil and the image surface). As mentioned above, it is necessary to space the exit pupil from the image surface at a distance above a predetermined value in order to form an image on the solid state image pickup device such as a CCD, etc., while keeping the telecentricity to ensure a uniform or regular color.

If the ratio is above the upper limit in condition (3), the distance between the diaphragm and the second lens group at the wide-angle extremity is increased, and the diameter of the second lens group becomes large.

If the ratio is below the lower limit, a sufficient exit pupil distance cannot be obtained.

Condition (4) specifies the power of the first lens element of the first lens group, located closest to the object, in connection with the correction of the distortion.

It is preferable that the distortion be corrected by the positive lens element distant from the diaphragm. If the ratio defined in condition (4) exceeds the upper limit, it is difficult to increase the angle of view at the wide-angle extremity. Conversely, if the ratio is not larger than the lower limit in condition (4), the distortion cannot be effectively corrected, hence an excess amount of negative distortion is produced.

Numerical examples (Embodiments 1 through 3) of the optical system of the present invention will be discussed below with reference to the following tables and drawings. In the following tables and drawings, "$F_{NO}$" designates the F-number, "f" the focal length, "W" the half field angle, fb the back focal distance including the glass cover (reduced distance between the last surface of the second lens group and the image pickup surface of the CCD), and "EX" the exit pupil distance, i.e., the distance between the exit pupil of the entire system and the image surface. The surface Nos. of the lenses are reckoned from the object side. "R" designates the radius of curvature, "D" the distance between the lens surfaces, "$N_d$" the refractive index for the d-line, and "$\upsilon$" the Abbe number. While in the following aberration diagrams, d-line, g-line and C-line represent the chromatic aberrations represented by spherical aberration and lateral (transverse) chromatic aberration, at the respective wavelengths, S represents the image surface of the Sagittal image, and M represents the image surface of the Meridional image.

Figure 20:
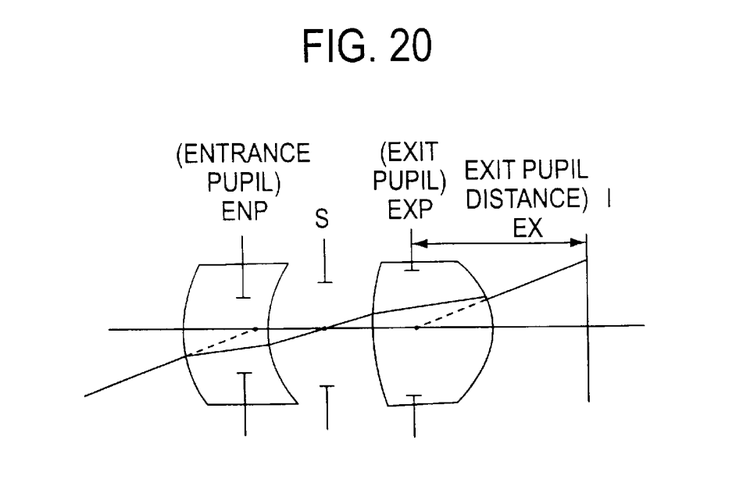
FIG. 20 is an explanatory view of an exit pupil distance.

FIG. 20 shows an explanatory view of the exit pupil distance EX. Namely, the exit pupil distance EX is defined by the distance between the position EXP of the exit pupil of the entire zoom lens system including the first and second lens groups 10 and 20 and the image surface I. ENP designates a position of an entrance pupil of the zoom lens system.

EXAMPLE 1

Figure 2:
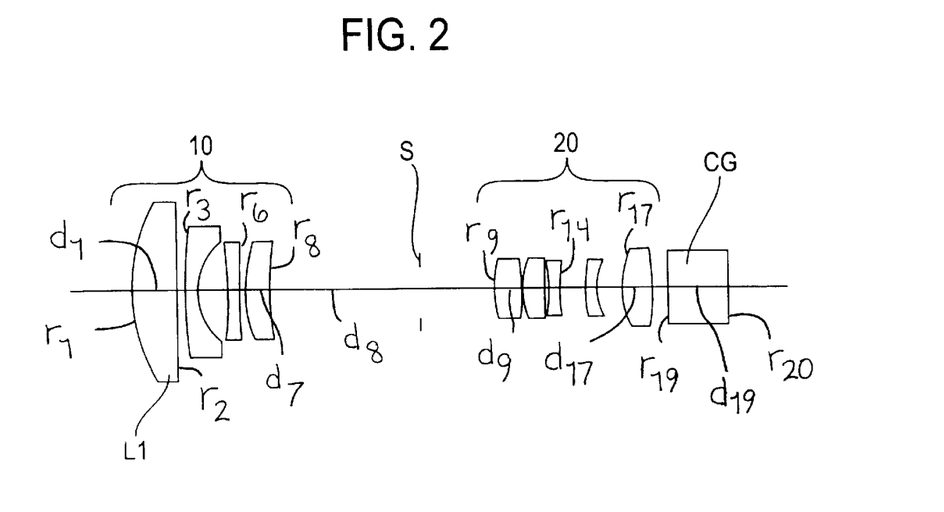
FIG. 2 is a schematic view of a lens arrangement of a zoom lens at a short focal length extremity, according to a first embodiment of the present invention.
Figures 3A, 3B:
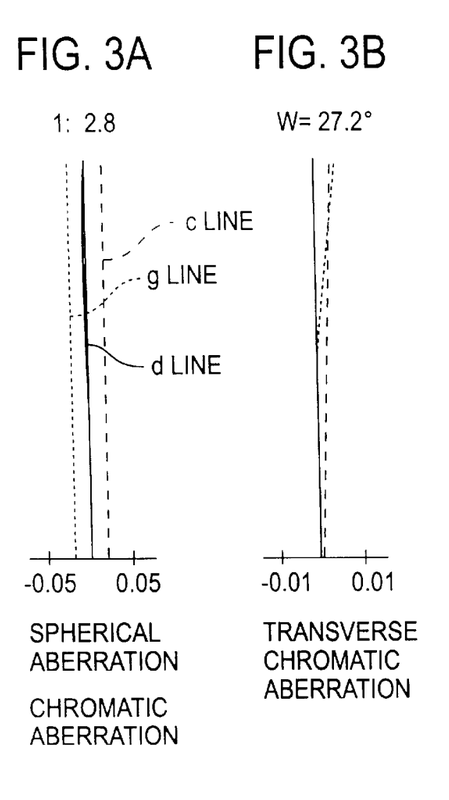
FIG. 3A, 3B, 3C and 3D show aberration diagrams of a lens system shown in FIG. 2.
Figure 3C:
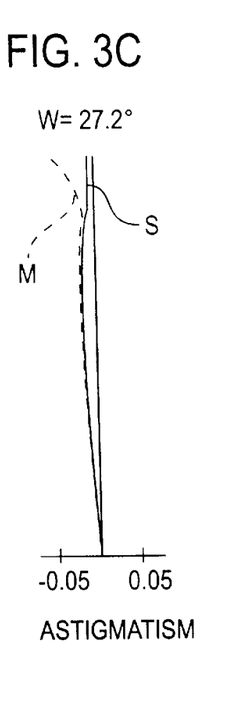
Figure 3D:
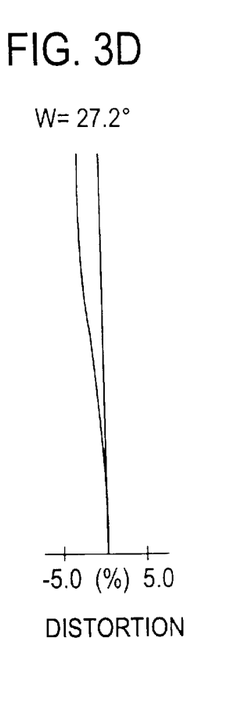
Figure 4:
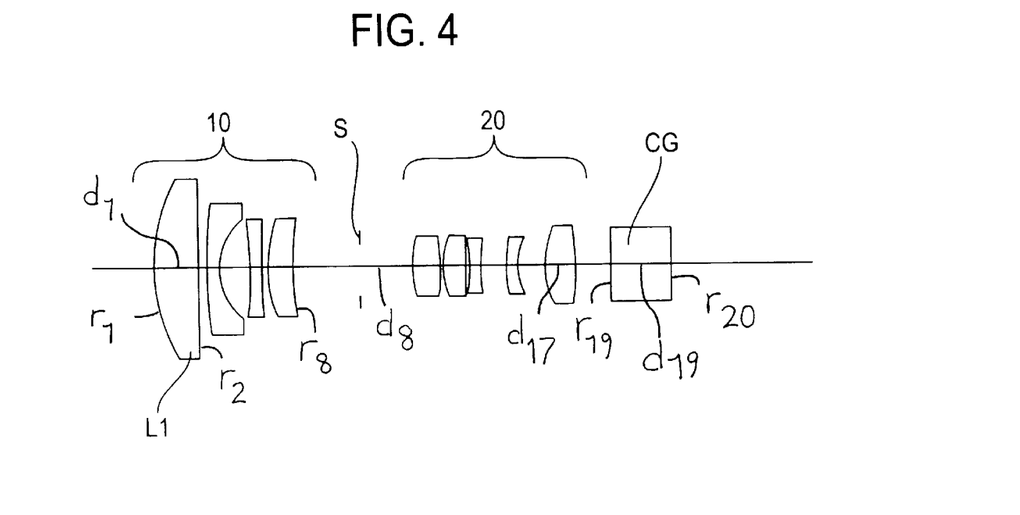
FIG. 4 is a schematic view of a lens arrangement of a zoom lens at an intermediate focal length, according to a first embodiment of the present invention.
Figure 5A:
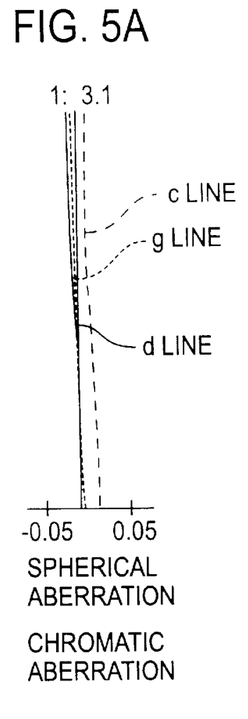
FIGS. 5A, 5B, 5C and 5D show aberration diagrams of a lens system shown in FIG. 4.
Figure 5B:
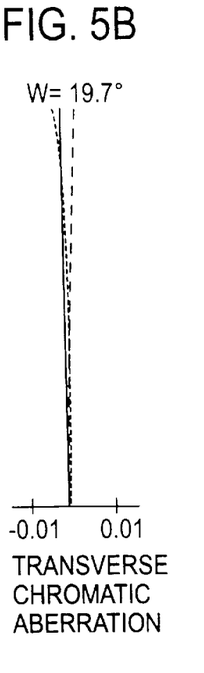
Figure 5C:
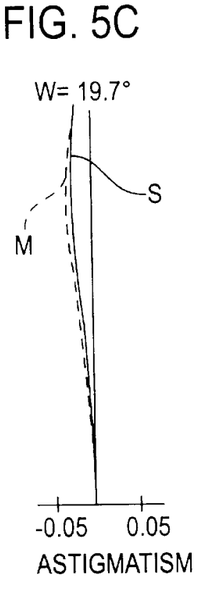
Figure 5D:
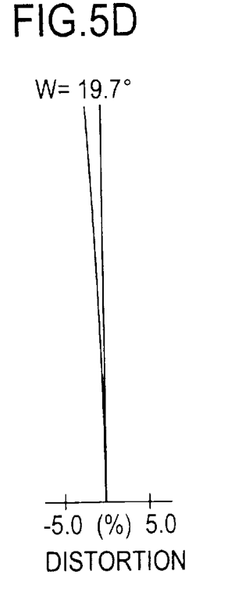
Figure 6:
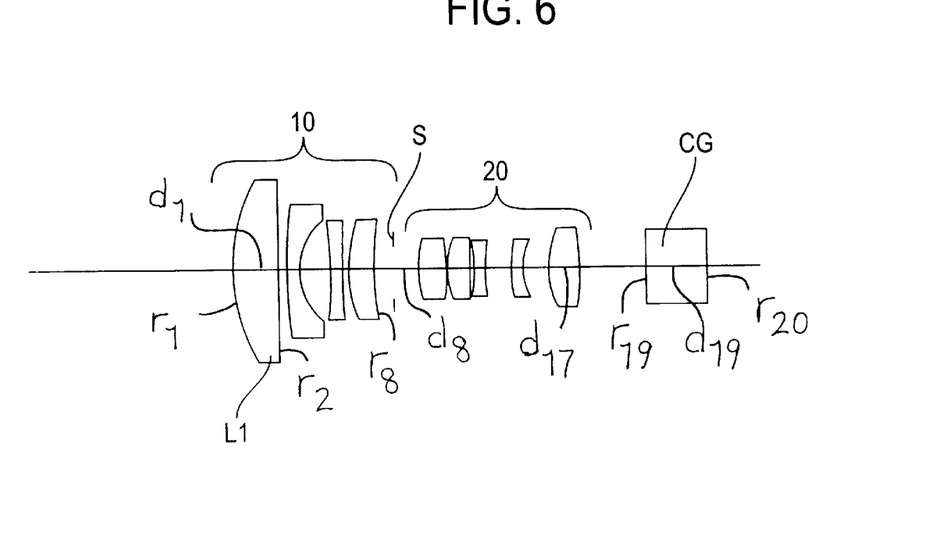
FIG. 6 is a schematic view of a lens arrangement of a zoom lens at a long focal length extremity, according to a first embodiment of the present invention.
Figure 7A:
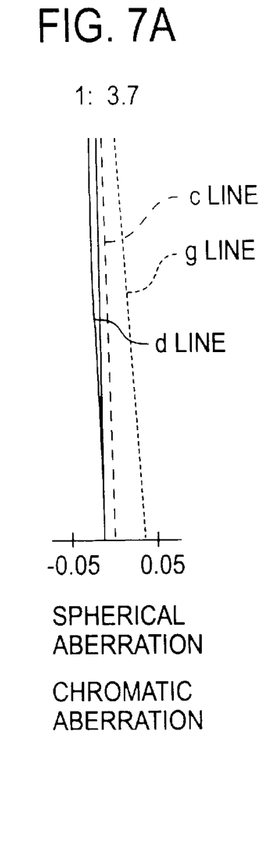
FIGS. 7A, 7B, 7C and 7D show aberration diagrams of a lens system shown in FIG. 6.
Figure 7B:
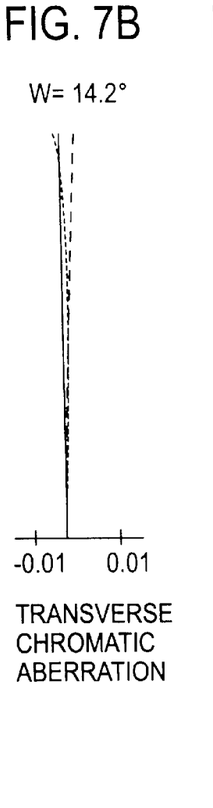
Figure 7C:
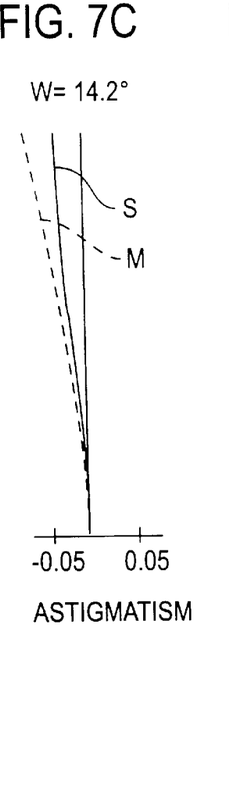
Figure 7D:
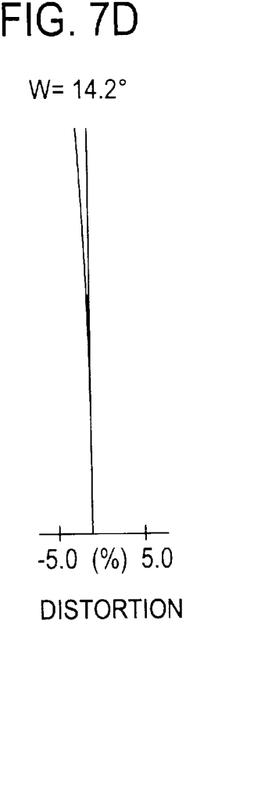

FIGS. 2 through FIGS. 7A, 7B, 7C and 7D show a first embodiment of the zoom lens system according to the present invention. FIGS. 2, 4 and 6 show a lens arrangement at the short focal length extremity, an intermediate focal length, and the long focal length extremity, respectively. The first negative lens group 10 is comprised of four lens elements of which the first lens element L1 on the object side is a positive lens element. The first lens element L1 has a convex surface at the object side thereof. The second positive lens group 20 is comprised of five lens elements. The diaphragm S is immovably provided between the first and second lens groups 10 and 20. FIGS. 3(A–D), FIGS. 5(A–D) and FIGS. 7(A–D) are diagrams showing the aberrations in the lens system shown in FIGS. 2, 4 and 6, respectively.

Numerical data of example 1 is shown in Table 1 below. The surface Nos. r19 and r20 are surfaces of the glass cover of the CCD. The image pickup surface of the CCD corresponds to the surface No. r20.

TABLE 1

$F_{NO} = 1:2.8 - 3.1 - 3.7$
$f = 6.00 - 8.50 - 12.00$
Zoom ratio (the longest focal length/the shortest focal length of the entire lens system);2.00
$W = 27.2 - 19.7 - 14.2$
$f_B = 4.64 - 6.45 - 8.99( = (1.34 - 3.15 - 5.69) + (5.00/1.51633))$
$EX = 156.45 - 55.53 - 34.07$
$f_W = 6.00$
$f_1 = -15.878$
$f_2 = 11.507$
$D_W = 10.64$
$f_{1-1} = 29.115$

| surface No. | R | D | $N_d$ | $\nu_d$ |
| --- | --- | --- | --- | --- |
| 1 | 15.291 | 4.17 | 1.48749 | 70.2 |
| 2 | −180.022 | 0.50 | — | — |
| 3 | 45.628 | 1.00 | 1.83481 | 42.7 |
| 4 | 5.940 | 2.47 | — | — |
| 5 | −30.638 | 0.90 | 1.81600 | 46.6 |
| 6 | 61.240 | 0.54 | — | — |
| 7 | 11.876 | 2.15 | 1.84666 | 23.8 |
| 8 | 31.598 | 12.48 − 5.33 − 1.60 | — | — |
| diaphragm | ∞ | 6.25 − 4.44 − 1.90 | — | — |
| 9 | 11.377 | 2.24 | 1.80400 | 46.6 |
| 10 | −23.698 | 0.10 | — | — |
| 11 | 8.290 | 1.99 | 1.61800 | 63.4 |
| 12 | 125.277 | 0.29 | — | — |
| 13 | −18.481 | 0.90 | 1.80518 | 25.4 |
| 14 | 12.032 | 2.17 | — | — |
| 15 | 12.115 | 0.90 | 1.84666 | 23.8 |
| 16 | 5.172 | 2.15 | — | — |
| 17 | 9.866 | 2.46 | 1.80400 | 46.6 |
| 18 | −25.016 | 1.34 − 3.15 − 5.69 | — | — |
| 19 | ∞ | 5.00 | 1.51633 | 64.1 |
| 20 | ∞ | — | — | — |

EXAMPLE 2

Figure 8:
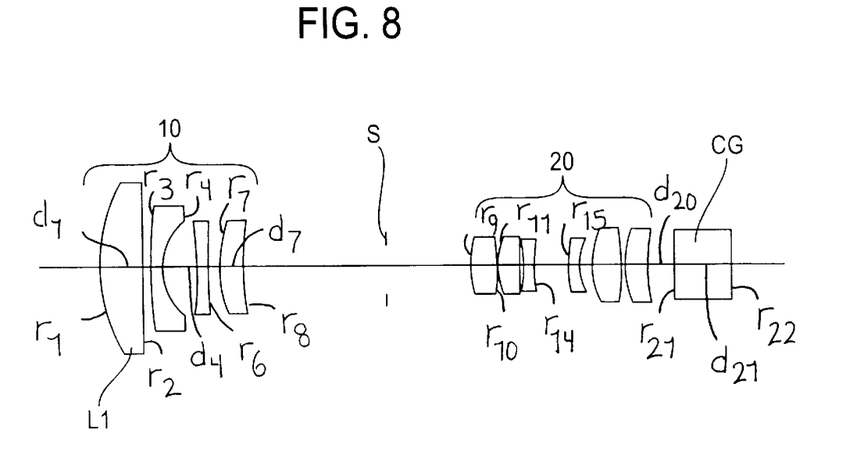
FIG. 8 is a schematic view of a lens arrangement of a zoom lens at a short focal length extremity, according to a second embodiment of the present invention.
Figures 9A, 9B:
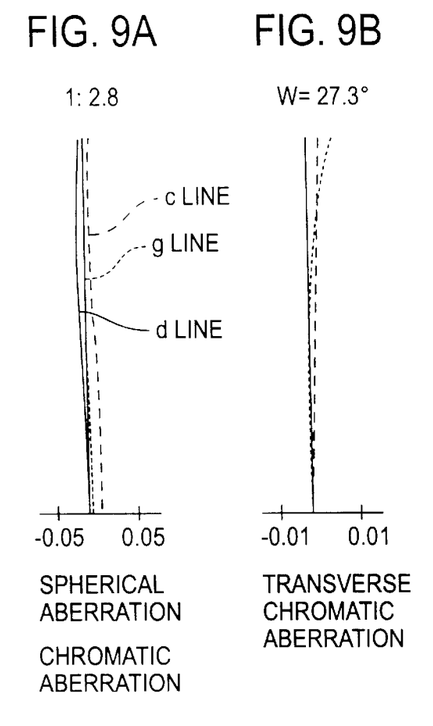
FIGS. 9A, 9B, 9C and 9D show aberration diagrams of a lens system shown in FIG. 8.
Figure 9C:
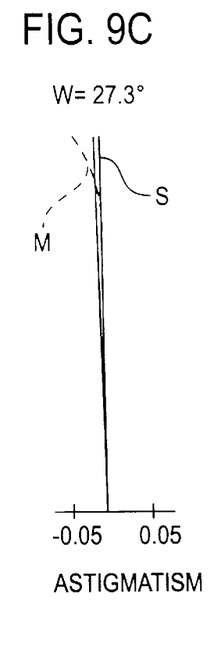
Figure 9D:
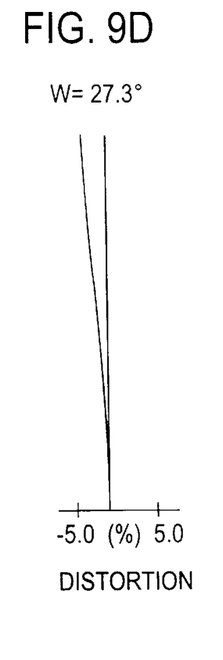
Figure 10:
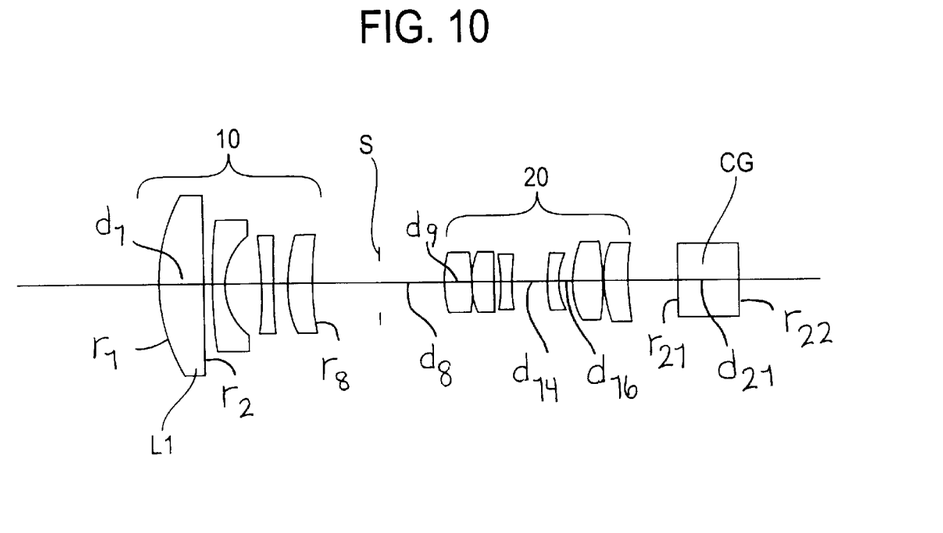
FIG. 10 is a schematic view of a lens arrangement of a zoom lens at an intermediate focal length, according to a second embodiment of the present invention.
Figure 11A:
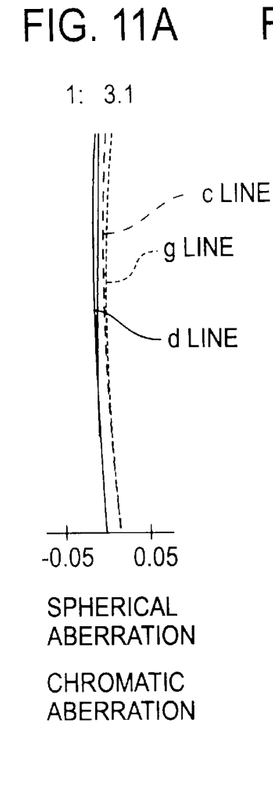
FIGS. 11A, 11B, 11C and 11D show aberration diagrams of a lens system shown in FIG. 10.
Figure 11B:
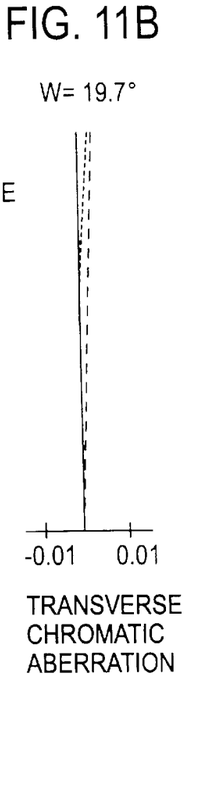
Figure 11C:
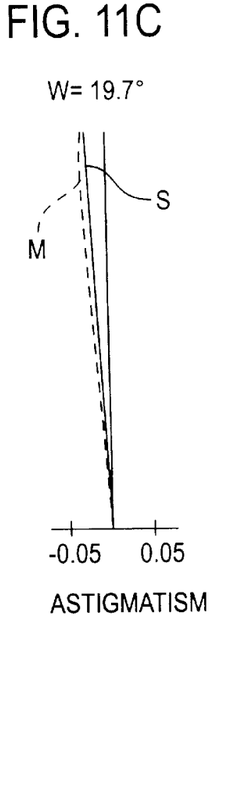
Figure 11D:
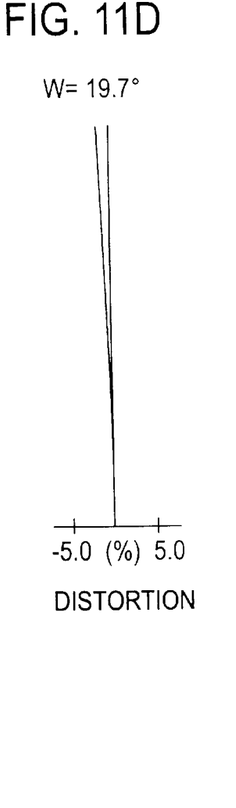
Figure 12:
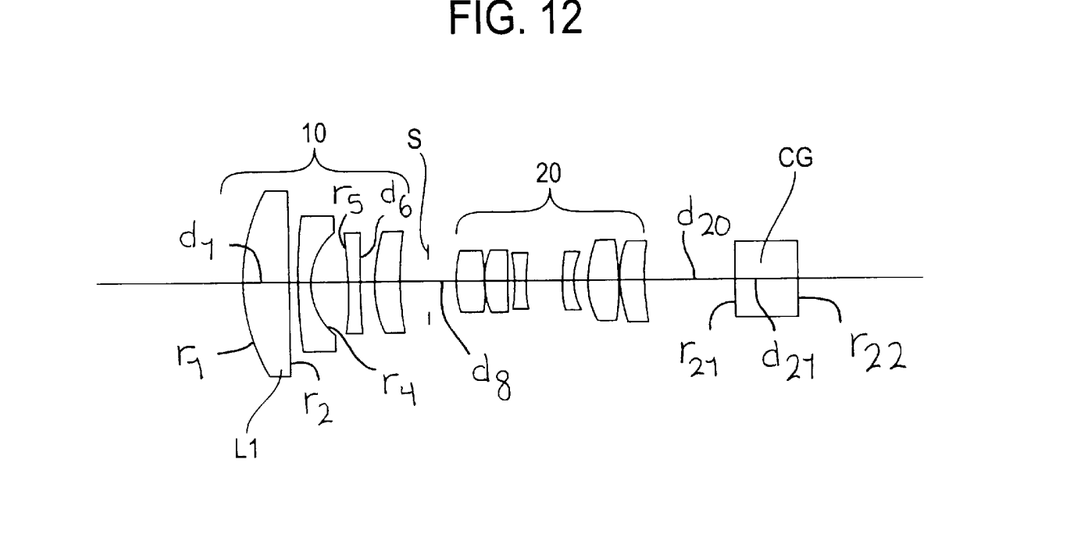
FIG. 12 is a schematic view of a lens arrangement of a zoom lens at a long focal length extremity, according to a second embodiment of the present invention.
Figures 13A, 13B:
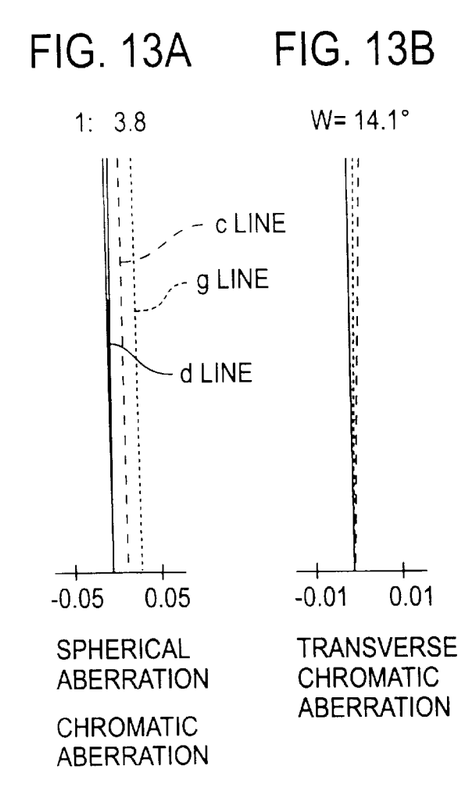
FIGS. 13A, 13B, 13C and 13D show aberration diagrams of a lens system shown in FIG. 12.
Figure 13C:
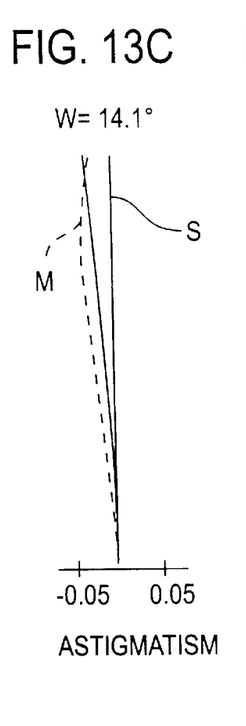
Figure 13D:
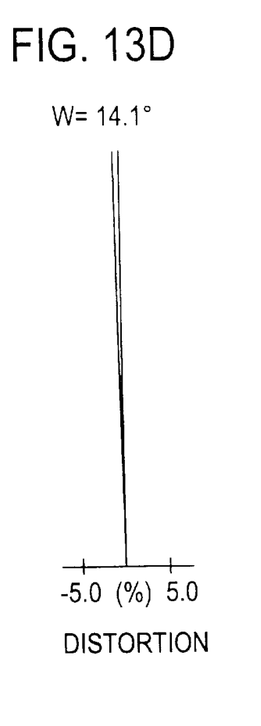

FIGS. 8 through FIGS. 13(A–D) show a second embodiment of the zoom lens system according to the present invention. FIGS. 8, 10 and 12 show a lens arrangement at the short focal length extremity, an intermediate focal length, and the long focal length extremity, respectively. The first negative lens group 10 is comprised of four lens elements of which the first lens element L1 on the object side is a positive lens element. The first lens element L1 has a convex surface at the object side thereof. The second positive lens group 20 is comprised of six lens elements. The diaphragm S is immovably provided between the first and second lens groups 10 and 20. FIGS. 9(A–D), FIGS. 11(A–D) and FIGS. 13(A–D) are diagrams showing the aberrations in the lens system shown in FIGS. 8, 10 and 12, respectively.

Numerical data of example 2 is shown in Table 2 below. The surface Nos. r21 and r22 are surfaces of the glass cover of the CCD. The image pickup surface of the CCD corresponds to the surface No. r22.

TABLE 2

$F_{NO} = 1:2.8 - 3.1 - 3.8$
$f = 6.00 - 8.50 - 12.00$
Zoom ratio (the longest focal length/the shortest focal length of the entire lens system);2.00
$W = 27.3 - 19.7 - 14.1$
$f_B = 5.52 - 7.50 - 10.27( = (2.22 - 4.20 - 6.97) + (5.00/1.51633))$
$EX = 103.32 - 48.29 - 32.46$
$f_W = 6.00$
$f_1 = -15.069$
$f_2 = 11.922$
$D_W = 10.48$
$f_{1-1} = 36.221$

| surface No. | R | D | $N_d$ | $\nu_d$ |
| --- | --- | --- | --- | --- |
| 1 | 18.252 | 4.20 | 1.48749 | 70.2 |
| 2 | −500.886 | 0.64 | — | — |
| 3 | 32.822 | 1.00 | 1.81600 | 46.6 |
| 4 | 6.249 | 3.00 | — | — |
| 5 | −36.462 | 0.90 | 1.77250 | 49.6 |
| 6 | 31.770 | 1.00 | — | — |
| 7 | 13.171 | 2.20 | 1.84666 | 23.8 |
| 8 | 34.834 | 12.17 − 5.34 − 1.95 | — | — |
| diaphragm | ∞ | 7.39 − 5.41 − 2.64 | — | — |
| 9 | 15.065 | 2.13 | 1.80400 | 46.6 |
| 10 | −27.600 | 0.10 | — | — |
| 11 | 10.698 | 2.08 | 1.61800 | 63.4 |
| 12 | −63.439 | 0.23 | — | — |
| 13 | −21.324 | 0.90 | 1.80518 | 25.4 |
| 14 | 16.011 | 3.09 | — | — |
| 15 | 13.270 | 0.90 | 1.84666 | 23.8 |
| 16 | 7.193 | 1.57 | — | — |
| 17 | 35.053 | 2.00 | 1.81600 | 46.6 |
| 18 | −31.740 | 0.32 | — | — |
| 19 | 11.075 | 1.95 | 1.77250 | 49.6 |
| 20 | 18.010 | 2.22 − 4.20 − 6.97 | — | — |
| 21 | ∞ | 5.00 | 1.51633 | 64.1 |
| 22 | ∞ | — | — | — |

EXAMPLE 3

Figure 14:
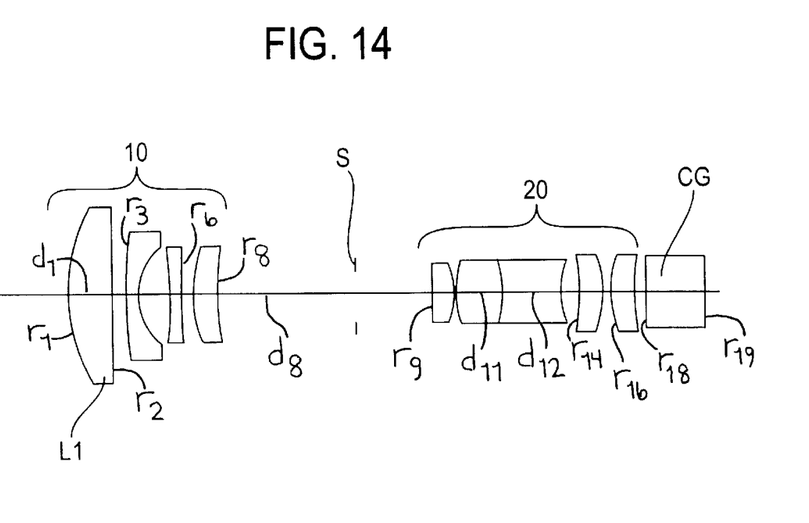
FIG. 14 is a schematic view of a lens arrangement of a zoom lens at a short focal length extremity, according to a third embodiment of the present invention.
Figures 15A, 15B:
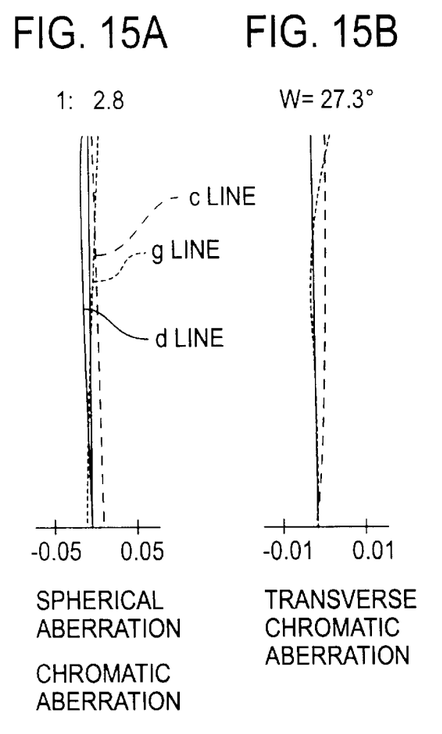
FIGS. 15A, 15B, 15C and 15D show aberration diagrams of a lens system shown in FIG. 14.
Figure 15C:
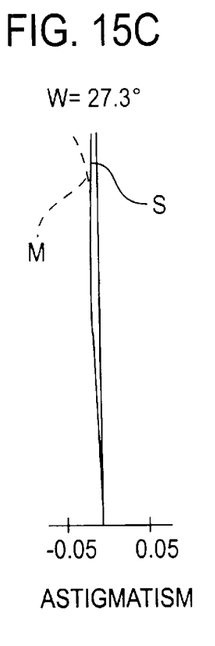
Figure 15D:
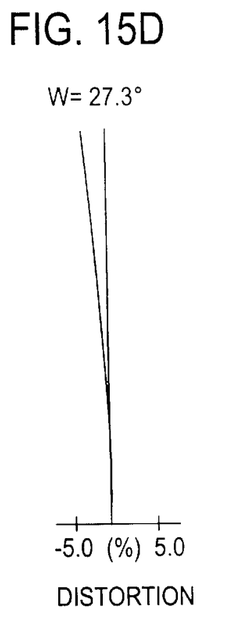
Figure 16:
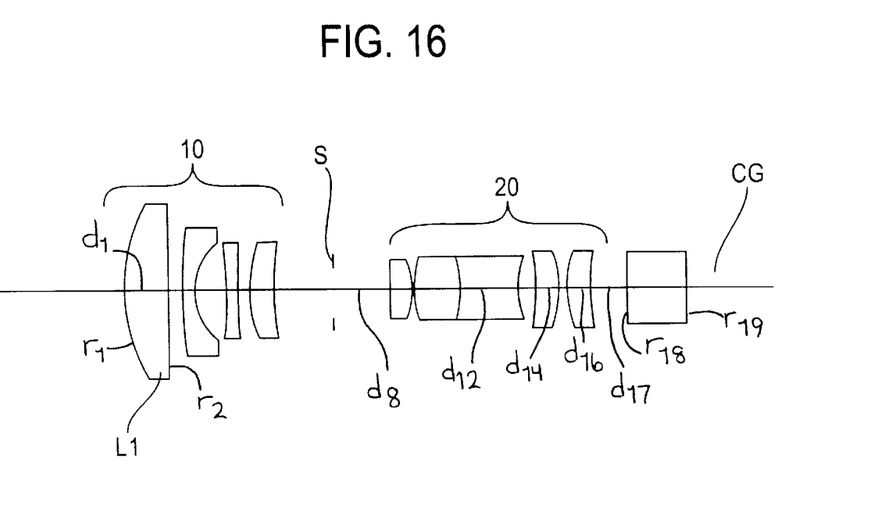
FIG. 16 is a schematic view of a lens arrangement of a zoom lens at an intermediate focal length, according to a third embodiment of the present invention.
Figure 17A:
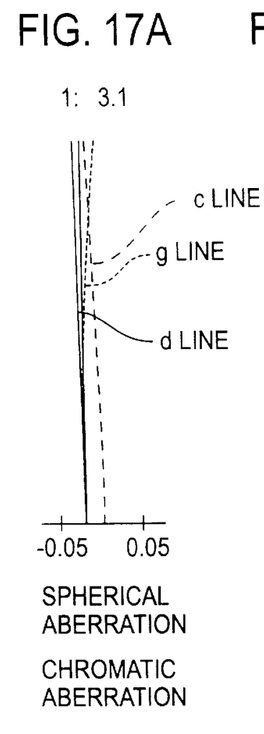
FIGS. 17A, 17B, 17C and 17D show aberration diagrams of a lens system shown in FIG. 16.
Figure 17B:
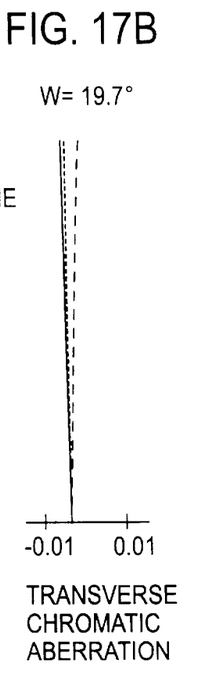
Figure 17C:
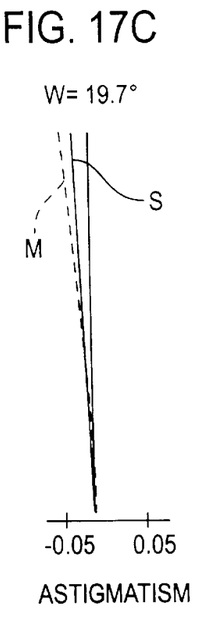
Figure 17D:
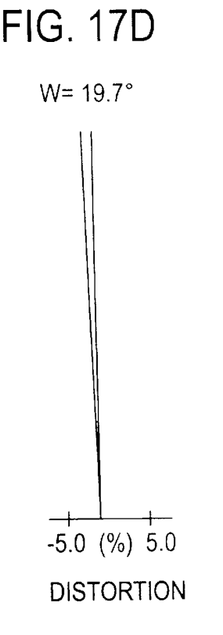
Figure 18:
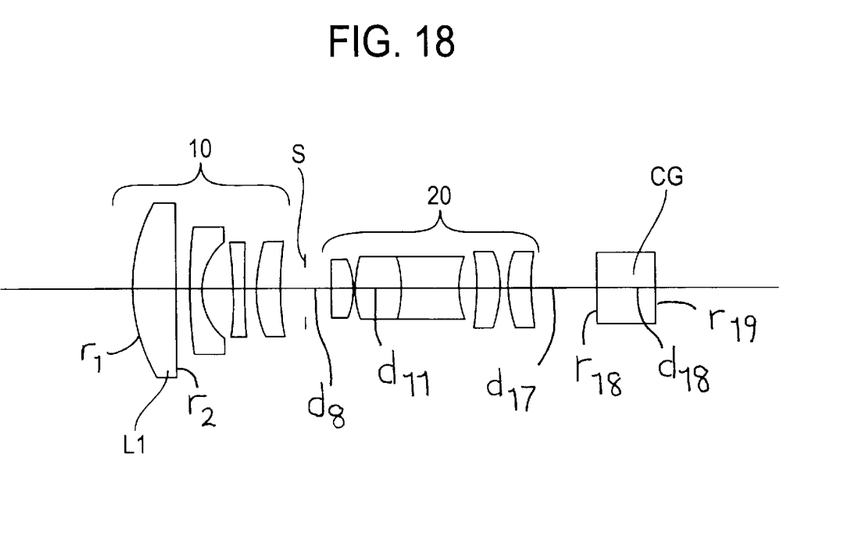
FIG. 18 is a schematic view of a lens arrangement of a zoom lens at a long focal length extremity, according to a third embodiment of the present invention.
Figure 19A:
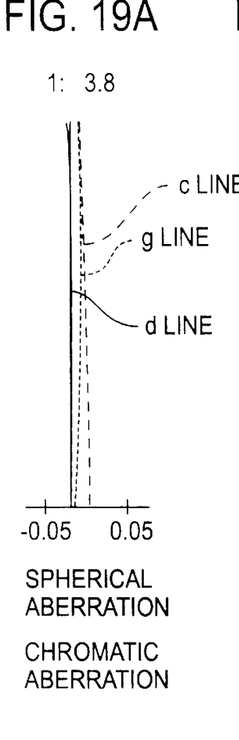
FIGS. 19A, 19B, 19C and 19D show aberration diagrams of a lens system shown in FIG. 6.
Figure 19B:
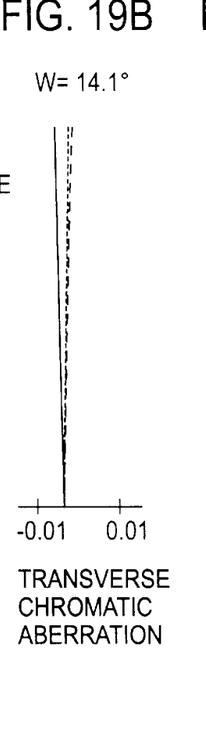
Figure 19C:
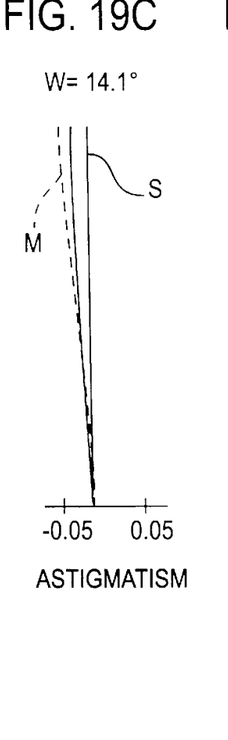
Figure 19D:
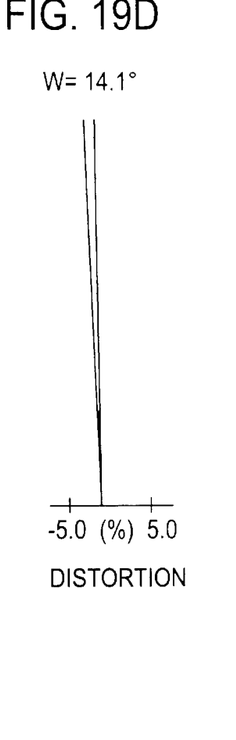

FIGS. 14 through FIGS. 19(A–D) show a third embodiment of the zoom lens system according to the present invention. FIGS. 14, 16 and 18 show a lens arrangement at the short focal length extremity, an intermediate focal length, and the long focal length extremity, respectively. The first negative lens group 10 is comprised of four lens elements of which the first lens element L1 on the object side is a positive lens element. The first lens element L1 has a convex surface at the object side thereof. The second positive lens group 20 is comprised of five lens elements, two of which are cemented each other. The diaphragm S, which is immovable, is provided between the first and second lens groups 10 and 20. FIGS. 15(A–D) and FIGS. 17(A–D) and FIGS. 19(A–D) are diagrams showing the aberrations in the lens system shown in FIGS. 14, 16 and 18, respectively.

Numerical data of example 3 is shown in Table 3 below. The surface Nos. r18 and r19 are surfaces of the glass cover of the CCD. The image pickup surface of the CCD corresponds to the surface No. r19.

TABLE 3

$F_{NO}$ = 1:2.8 – 3.1 – 3.8
f = 6.00 – 8.50 – 12.00
Zoom ratio (the longest focal length/the shortest focal length of the entire lens system);2.00
W = 27.3 – 19.7 – 14.1
$f_B$ = 4.30 – 6.22 – 8.90( = (1.00 – 2.92 – 5.60) + (5.00/1.51633))
EX = 129.92 – 50.31 – 32.11
$f_W$ = 6.00
$f_1$ = –14.829
$f_2$ = 11.353
$D_W$ = 10.32
$f_{1-1}$ = 32.173

| surface No. | R | D | $N_d$ | $v_d$ |
|---|---|---|---|---|
| 1 | 15.441 | 4.20 | 1.48749 | 70.2 |
| 2 | 907.066 | 1.10 | — | — |
| 3 | 38.132 | 1.00 | 1.81600 | 46.6 |
| 4 | 6.019 | 2.39 | — | — |
| 5 | –1691.960 | 0.90 | 1.77250 | 49.6 |
| 6 | 15.728 | 0.99 | — | — |
| 7 | 10.300 | 2.20 | 1.84666 | 23.8 |
| 8 | 21.944 | 11.58 – 5.25 – 2.15 | — | — |
| diaphragm | ∞ | 6.53 – 4.62 – 1.94 | — | — |
| 9 | 31.076 | 1.95 | 1.80400 | 46.6 |
| 10 | –20.705 | 0.10 | — | — |
| 11 | 9.059 | 3.99 | 1.61772 | 49.8 |
| 12 | –10.508 | 5.02 | 1.80518 | 25.4 |
| 13 | 6.552 | 1.42 | — | — |
| 14 | –49.412 | 2.19 | 1.81600 | 46.6 |
| 15 | –15.867 | 0.40 | — | — |
| 16 | 10.277 | 2.21 | 1.77250 | 49.6 |
| 17 | 39.241 | 1.00 – 2.92 – 5.60 | — | — |
| 18 | ∞ | 5.00 | 1.51633 | 64.1 |
| 19 | ∞ | — | — | — |

Table 4 below shows numerical values of the conditions (1) through (4) for the three embodiments mentioned above.

TABLE 4

| | embodiment 1 | embodiment 2 | embodiment 3 |
|---|---|---|---|
| formula(1) | 0.521 | 0.503 | 0.528 |
| formula(2) | 0.725 | 0.791 | 0.766 |
| formula(3) | 0.924 | 0.879 | 0.909 |
| formula(4) | 0.545 | 0.416 | 0.461 |

As can be seen from Table 4, each embodiment satisfies conditions (1) through (4), and the aberrations are well corrected at the wide-angle extremity, the intermediate focal length and the telephoto extremity, respectively.

As may be understood from the above discussion, according to the present invention, a sufficient exit pupil distance is obtained between the exit pupil of the entire optical system and the image surface over the entire zoom ratio range from the wide-angle extremity to the telephoto extremity. Moreover, since the diaphragm is fixed so as not to move during the zooming operation, not only can the structure of the lens frame be simplified, but also the negative distortion can be effectively corrected.

What is claimed is:

1. A zoom lens comprising a first movable lens group having negative refracting power and a second movable lens group having positive refracting power, in this order from the object side, and an immovable diaphragm provided between said first and second lens groups so as not to move during the zooming operation, wherein said zoom lens satisfies the following conditions:

(1) $0.45 < f_w/f_2 < 0.7$, (2) $0.5 < f_2/|f_1| < 1.0$, (3) $0.8 < D_w/f_2 < 1.3$, wherein fw represents the focal length of the entire optical system at the wide-angle extremity, $f_1$ is the focal length of the first lens group ($f_1 < 0$), $f_2$ represents the focal length of the second lens group ($f_2 > 0$), $D_w$ represents the distance between the diaphragm and the first principal point of the second lens group at the wide-angle extremity.

2. A zoom lens according to claim 1, wherein said first lens group includes a positive lens element which is located closest to the object and satisfies the following condition:

(4) $0.2 < |f_1|/f_{1-1} < 0.7$, wherein $f_{1-1}$ represents the focal length of the positive lens element in the first lens group ($f_{1-1} < 0$).

3. A zoom lens according to claim 1, wherein said first and second lens groups are moved toward each other during the zooming operation from the short focal length extremity toward the long focal length extremity and are moved away from each other during the zooming operation from the long focal length extremity toward the short focal length extremity.

4. A zoom lens according to claim 1, further comprising a solid state image pickup device provided on an image forming surface of the zoom lens.

5. A zoom lens according to claim 1, wherein said first lens group includes a positive lens element which is located closest to the object, a surface of said positive lens element at the object side being a convex surface.

* * * * *